US012737343B2

(12) United States Patent
Greenwood

(10) Patent No.: US 12,737,343 B2
(45) Date of Patent: Sep. 15, 2026

(54) SYSTEMS AND METHODS FOR DYNAMIC TABLE GENERATION

(71) Applicant: Truist Bank, Charlotte, NC (US)

(72) Inventor: Keith Greenwood, Charlotte, NC (US)

(73) Assignee: Truist Bank, Charlotte, NC (US)

( * ) Notice: Subject to any disclaimer, the term of this patent is extended or adjusted under 35 U.S.C. 154(b) by 0 days.

(21) Appl. No.: 18/825,149

(22) Filed: Sep. 5, 2024

(65) Prior Publication Data

US 2026/0064654 A1 Mar. 5, 2026

(51) Int. Cl.

*G06F 16/23* (2019.01)
*G06F 16/21* (2019.01)
*G06F 16/2455* (2019.01)

(52) U.S. Cl.

CPC .............. *G06F 16/23* (2019.01); *G06F 16/21* (2019.01); *G06F 16/2456* (2019.01)

(58) Field of Classification Search

CPC ...... G06F 16/23; G06F 16/21; G06F 16/2456; G06F 16/284; G06F 16/289; G06F 16/90; G06F 16/24; G06F 16/28; G06F 16/24535; Y10S 707/99944; Y10S 707/99943

USPC .......................................................... 707/609

See application file for complete search history.

(56) References Cited

U.S. PATENT DOCUMENTS 7,082,435 B1 * 7/2006 Guzman ............... G06F 16/284 707/999.102
7,941,395 B2 * 5/2011 Cassidy .................. G06F 16/86 707/634
2003/0204643 A1 * 10/2003 Yamauchi ............... G06F 9/546 719/318
2004/0236767 A1 * 11/2004 Soylemez ............. G06F 16/283
2006/0004750 A1 * 1/2006 Huang ..................... G06F 16/90
2006/0095413 A1 * 5/2006 Moffat .................. G06F 16/284
2007/0143572 A1 * 6/2007 Lee ....................... G06F 16/252 707/E17.069
2010/0299367 A1 * 11/2010 Chakrabarti ...... G06F 16/24578 707/769
2011/0099536 A1 * 4/2011 Coldicott .................. G06F 8/77 706/52
2011/0196890 A1 * 8/2011 Pfeifle ..................... G06F 16/29 707/769
2012/0197849 A1 * 8/2012 Srinivasa ............ G06F 16/2452 707/E17.046
2013/0339385 A1 * 12/2013 Abrams ................ G06F 16/256 707/E17.014
2015/0134599 A1 * 5/2015 Banerjee ................. G06F 16/25 707/607
2016/0364448 A1 * 12/2016 Wang .................. G06F 16/2453
2017/0262495 A1 * 9/2017 Peloski ............... G06F 16/2393
2020/0250166 A1 * 8/2020 Mathur ................. G06F 16/221
2022/0121632 A1 * 4/2022 Sassin ................... G06F 16/245

(Continued)

*Primary Examiner* — Hicham Skhoun

(74) *Attorney, Agent, or Firm* — Jordan IP Law LLC; Michael A. Springs, Esq.

(57) ABSTRACT

A method, computer program product, and computer system for defining, by a computing device, a virtual table created using one or more elements. The virtual table may be populated with data retrieved from one or more physical tables, wherein the one or more physical tables may include one or more relational datastore schemas of a relational datastore. A modification to the virtual table may be received. The virtual table may be modified in the relational datastore without adding another relational datastore schema.

17 Claims, 7 Drawing Sheets

(56) References Cited

U.S. PATENT DOCUMENTS

2024/0045884 A1* 2/2024 Lilko ...................... G06F 16/27
2025/0156384 A1* 5/2025 Rajagopalan ........... H04L 51/02

* cited by examiner

SYSTEMS AND METHODS FOR DYNAMIC TABLE GENERATION

TECHNICAL FIELD

The present disclosure relates to relational datastores used over a network, and more particularly, to processing updates to a relational datastore over a network without the need to create a new schema.

BACKGROUND

Generally, the use of a relational datastore (e.g., a relational database) requires development of its schema ahead of time, and it normally specifically matches the current usage of the datastore. This can be time consuming, and can also mean that one can only implement changes the schema during an application update (e.g., during a deployment).

SUMMARY

In one example implementation, a computer-implemented method, performed by one or more computing devices, may include but is not limited to defining, by a computing device, a virtual table created using one or more elements. The virtual table may be populated with data retrieved from one or more physical tables, wherein the one or more physical tables may include one or more relational datastore schemas. A modification to the virtual table may be received. The virtual table may be modified in the relational datastore without adding another relational datastore schema.

One or more of the following example features may be included. The one or more elements may include at least one of physical tables, views, functions, and stored procedures. Populating the virtual table may include encapsulating SQL commands to dynamically assemble the data. Populating the virtual table may include joining the virtual table and at least a second virtual table with one or more physical tables underlying the virtual table. Modifying the virtual table in the relational datastore without modifying the virtual table schema may include modifying data from one or more physical tables underlying the virtual table. A pivot table query may be generated for the virtual table. Generating the pivot table query for the virtual table may include constructing a dynamic SQL query.

In another example implementation, a computing system may include one or more processors and one or more memories configured to perform operations that may include but are not limited to defining, by a computing device, a virtual table created using one or more elements. The virtual table may be populated with data retrieved from one or more physical tables, wherein the one or more physical tables may include one or more relational datastore schemas. A modification to the virtual table may be received. The virtual table may be modified in the relational datastore without adding another relational datastore schema.

One or more of the following example features may be included. The one or more elements may include at least one of physical tables, views, functions, and stored procedures. Populating the virtual table may include encapsulating SQL commands to dynamically assemble the data. Populating the virtual table may include joining the virtual table and at least a second virtual table with one or more physical tables underlying the virtual table. Modifying the virtual table in the relational datastore without modifying the virtual table schema may include modifying data from one or more physical tables underlying the virtual table. A pivot table query may be generated for the virtual table. Generating the pivot table query for the virtual table may include constructing a dynamic SQL query.

In another example implementation, a computer program product may reside on a computer readable storage medium having a plurality of instructions stored thereon which, when executed across one or more processors, may cause at least a portion of the one or more processors to perform operations that may include but are not limited to defining, by a computing device, a virtual table created using one or more elements. The virtual table may be populated with data retrieved from one or more physical tables, wherein the one or more physical tables may include one or more relational datastore schemas. A modification to the virtual table may be received. The virtual table may be modified in the relational datastore without adding another relational datastore schema.

One or more of the following example features may be included. The one or more elements may include at least one of physical tables, views, functions, and stored procedures. Populating the virtual table may include encapsulating SQL commands to dynamically assemble the data. Populating the virtual table may include joining the virtual table and at least a second virtual table with one or more physical tables underlying the virtual table. Modifying the virtual table in the relational datastore without modifying the virtual table schema may include modifying data from one or more physical tables underlying the virtual table. A pivot table query may be generated for the virtual table. Generating the pivot table query for the virtual table may include constructing a dynamic SQL query.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

DRAWINGS

Like reference symbols in the various drawings indicate like elements.

DESCRIPTION

Figure 1:
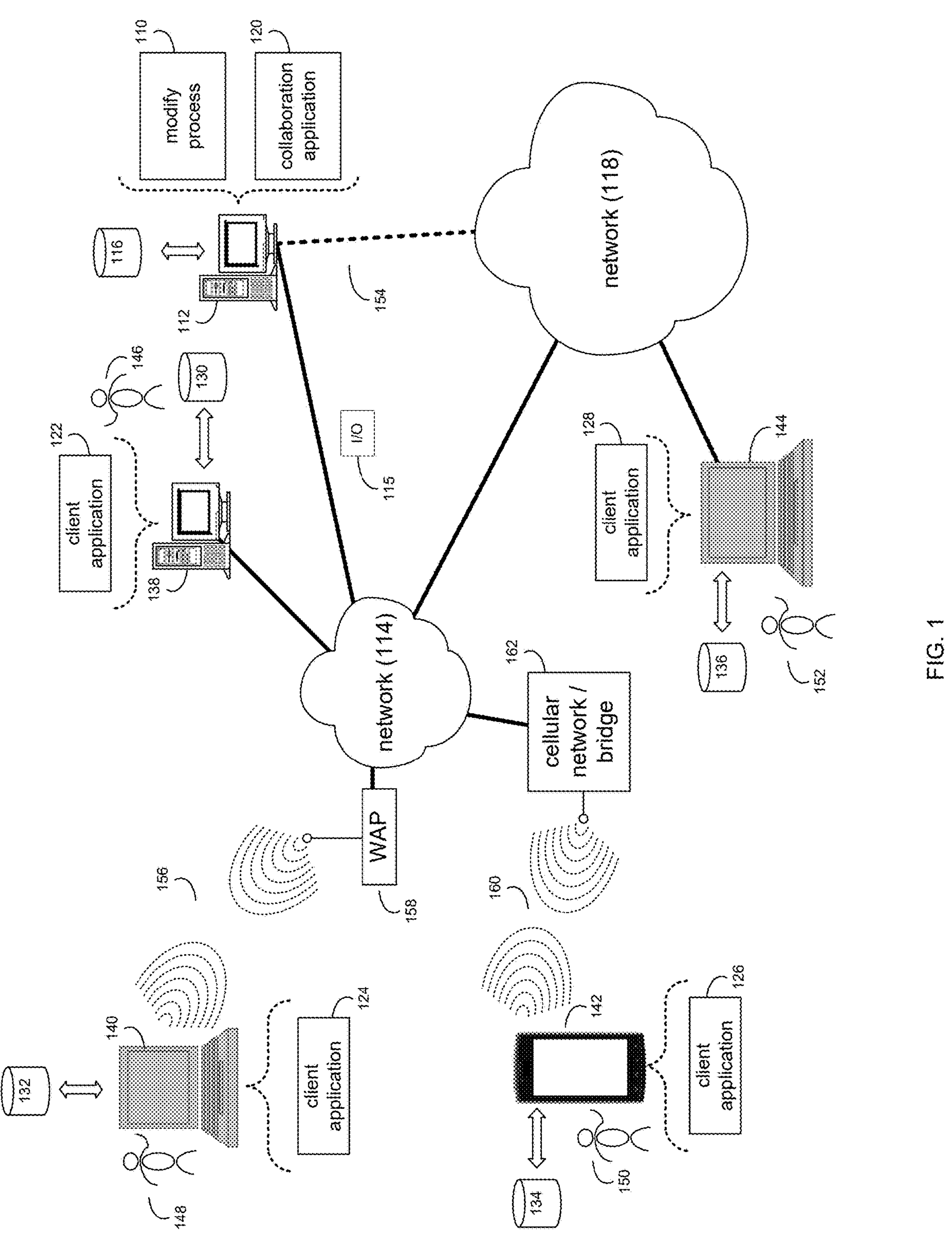
FIG. 1 is an example diagrammatic view of a modify process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

Software may include artificial intelligence (AI) systems, which may include machine learning or other computational intelligence. For example, AI may include one or more models used for one or more problem domains. When presented with many data features, identification of a subset of features that are relevant to a problem domain may improve prediction accuracy, reduce storage space, and increase processing speed. This identification may be referred to as feature engineering. Feature engineering may be performed by users or may only be guided by users. In various implementations, a machine learning system may computationally identify relevant features, such as by performing singular value decomposition on the contributions of different features to outputs.

In some implementations, the various computing devices may include, integrate with, link to, exchange data with, be governed by, take inputs from, and/or provide outputs to one or more AI systems, which may include models, rule-based systems, expert systems, neural networks, deep learning systems, supervised learning systems, robotic process automation systems, natural language processing systems, intelligent agent systems, self-optimizing and self-organizing systems, and others. Except where context specifically indicates otherwise, references to AI, or to one or more examples of AI, should be understood to encompass one or more of these various alternative methods and systems; for example, without limitation, an AI system described for enabling any of a wide variety of functions, capabilities and solutions described herein (such as optimization, autonomous operation, prediction, control, orchestration, or the like) should be understood to be capable of implementation by operation on a model or rule set; by training on a training data set of human tag, labels, or the like; by training on a training data set of human interactions (e.g., human interactions with software interfaces or hardware systems); by training on a training data set of outcomes; by training on an AI-generated training data set (e.g., where a full training data set is generated by AI from a seed training data set); by supervised learning; by semi-supervised learning; by deep learning; or the like. For any given function or capability that is described herein, neural networks of various types may be used, including any of the types described herein, and in embodiments a hybrid set of neural networks may be selected such that within the set a neural network type that is more favorable for performing each element of a multi-function or multi-capability system or method is implemented. As one example among many, a deep learning, or black box, system may use a gated recurrent neural network for a function like language translation for an intelligent agent, where the underlying mechanisms of AI operation need not be understood as long as outcomes are favorably perceived by users, while a more transparent model or system and a simpler neural network may be used for a system for automated governance, where a greater understanding of how inputs are translated to outputs may be needed to comply with regulations or policies.

Examples of the models (e.g., AI-based models) include recurrent neural networks (RNNs) such as long short-term memory (LSTM), deep learning models such as transformers, decision trees, support-vector machines, genetic algorithms, Bayesian networks, and regression analysis. Examples of systems based on a transformer model include bidirectional encoder representations from transformers (BERT) and generative pre-trained transformers (GPT). Training a machine-learning model (or other type of AI-based learning models) may include supervised learning (for example, based on labelled input data), unsupervised learning, and reinforcement learning. In various embodiments, a machine-learning model may be pre-trained by their operator or by a third party. Problem domains include nearly any situation where structured data can be collected, and includes natural language processing (NLP), including natural language understanding (NLU), computer vision (CV), classification, image recognition, etc. Some or all of the software may run in a virtual environment rather than directly on hardware. The virtual environment may include a hypervisor, emulator, sandbox, container engine, etc. The software may be built as a virtual machine, a container, etc. Virtualized resources may be controlled using, for example, a DOCKER container platform, a pivotal cloud foundry (PCF) platform, etc. Some or all of the software may be logically partitioned into microservices. Each microservice offers a reduced subset of functionality. In various embodiments, each microservice may be scaled independently depending on load, either by devoting more resources to the microservice or by instantiating more instances of the microservice. In various embodiments, functionality offered by one or more microservices may be combined with each other and/or with other software not adhering to a microservices model.

In some implementations, as noted above, AI-based learning models may include at least one of a transformer model, a convolutional neural network, a deep learning model trained on a set of outcomes of the value chain network entity, a supervised model, a semi-supervised model, an unsupervised model, or a reinforcement model, and the training data set for the AI-based learning models may include one or a set of objects or events that are labeled to classify the set of objects or events according to a classification taxonomy. Other examples of AI-based learning models (e.g., machine learning models) may include neural networks in general (e.g., deep neural networks, convolution neural networks, and many others), regression-based models, decision trees, hidden forests, Hidden Markov models, Bayesian models, and the like. In some implementations, the present disclosure may include combinations where an expert system uses one neural network for classifying an item and a different (or the same) neural network for predicting a state of the item.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium or storage device may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, solid state drives (SSDs), a digital versatile disk (DVD), a Blu-ray disc, and an Ultra HD Blu-ray disc, a static random access memory (SRAM), dynamic RAM (DRAM), synchronous DRAM (SDRAM), synchronous graphics RAM (SGRAM), and video RAM (VRAM), analog magnetic tape, digital magnetic tape, rotating hard disk drive (HDDs), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

Examples of storage implemented by the storage hardware include a distributed ledger, such as a permissioned or permissionless blockchain. Entities recording transactions, such as in a blockchain, may reach consensus using an algorithm such as proof-of-stake, proof-of-work, and proof-of-storage. Elements of the present disclosure may be represented by or encoded as non-fungible tokens (NFTs). Ownership rights related to the non-fungible tokens may be recorded in or referenced by a distributed ledger. Transactions initiated by or relevant to the present disclosure may use one or both of fiat currency and cryptocurrencies, examples of which include bitcoin and ether.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, state information that personalizes electronic circuitry and/or other structural components that are native to hardware (e.g., host processor, central processing unit/CPU, microcontroller, etc.) or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as JavaScript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a network, such as a cellular network, local area network (LAN), a wide area network (WAN), a body area network BAN), a personal area network (PAN), a metropolitan area network (MAN), etc., or the connection may be made to an external computer (for example, through the internet using an Internet Service Provider). The networks may include one or more of point-to-point and mesh technologies. Data transmitted or received by the networking components may traverse the same or different networks. Networks may be connected to each other over a WAN or point-to-point leased lines using technologies such as Multiprotocol Label Switching (MPLS) and virtual private networks (VPNs), etc. In some implementations, electronic circuitry including, for example, programmable logic circuitry, an application specific integrated circuit (ASIC), gate arrays such as field-programmable gate arrays (FPGAs) or other hardware accelerators, microcontroller units (MCUs), or programmable logic arrays (PLAs), integrated circuits (ICs), digital circuit elements, analog circuit elements, combinational logic circuits, digital signal processors (DSPs), complex programmable logic devices (CPLDs), memory chips, network chips, systems on chip (SoCs), SSD/NAND controller ASICs, and the like, etc. may execute the computer readable program instructions/code by utilizing state information of the computer readable program instructions to personalize the electronic circuitry, in order to perform aspects of the present disclosure. Configurable or fixed-functionality logic may be implemented with complementary metal oxide semiconductor (CMOS) logic circuits, transistor-transistor logic (TTL) logic circuits, or other circuits. Multiple components of the hardware may be integrated, such as on a single die, in a single package, or on a single printed circuit board or logic board. For example, multiple components of the hardware may be implemented as a system-on-chip. A component, or a set of integrated components, may be referred to as a chip, chipset, chiplet, or chip stack. Examples of a system-on-chip include a radio frequency (RF) system-on-chip, an AI system-on-chip, a video processing system-on-chip, an organ-on-chip, a quantum algorithm system-on-chip, etc.

Examples of processing hardware may include, e.g., a central processing unit (CPU), a graphics processing unit (GPU), an accelerator (e.g., an AI accelerator), an approximate computing processor, a quantum computing processor, a parallel computing processor, a neural network processor, a signal processor, a digital processor, an analog processor, a data processor, an embedded processor, a microprocessor, and a co-processor. The co-processor may provide additional processing functions and/or optimizations, such as for speed or power consumption. Examples of a co-processor include a math co-processor, a graphics co-processor, a communication co-processor, a video co-processor, and an AI co-processor.

In some implementations, the AI accelerator may include suitable logic, circuitry, and/or interfaces to accelerate artificial intelligence applications, such as, e.g., artificial neural networks, machine vision and machine learning applications, including through parallel processing techniques. In one or more examples, the AI accelerator may include hardware logic or devices such as, e.g., a GPU or an FPGA. The AI accelerator may be used with any of the devices, components, features or methods described herein.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function (s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved. In addition, in some of the drawings, signal conductor lines may be represented with lines. Some may be different, to indicate more constituent signal paths, have a number label, to indicate a number of constituent signal paths, and/or have arrows at one or more ends, to indicate primary information flow direction(s). This, however, should not be construed in a limiting manner. Rather, such added detail may be used in connection with one or more implementations to facilitate ease of understanding. Any represented lines, whether or not having additional information, may actually comprise one or more signals/information that may travel in multiple directions and may be implemented with any suitable type of signal scheme, e.g., digital or analog lines implemented with differential pairs, optical fiber lines, and/or single-ended lines, etc.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown modify process 110 that may reside on and may be executed by a computer (e.g., computer 112), which may be connected to a network (e.g., network 114) (e.g., the internet or a local area network). Examples of computer 112 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer (s), or a computing cloud(s). A SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 112 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a modify process, such as modify process 110 of FIG. 1, may define, by a computing device, a virtual table created using one or more elements. The virtual table may be populated with data retrieved from one or more physical tables, wherein the one or more physical tables may include one or more relational datastore schemas. A modification to the virtual table may be received. The virtual table may be modified in the relational datastore without adding another relational datastore schema.

In some implementations, the instruction sets and subroutines of modify process 110, which may be stored on storage device, such as storage device 116, coupled to computer 112, may be executed by one or more processors and one or more memory architectures included within computer 112. In some implementations, storage device 116 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 116 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 114 may be connected to one or more secondary networks (e.g., network 118), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 112 may include a data store, such as a database (e.g., relational database, object-oriented database, triplestore database, etc.), a data store, a data lake, a column store, and/or a data warehouse, and may be located within any suitable memory location, such as storage device 116 coupled to computer 112. In some implementations, data, metadata, information, etc. described throughout the present disclosure may be stored in the data store. In some implementations, computer 112 may utilize any known database management system such as, but not limited to, DB2, SQL Server Management Studio, etc., in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, modify process 110 may be a component of the data store, a standalone application that interfaces with the above noted data store and/or an applet/application that is accessed via client applications 122, 124, 126, 128. In some implementations, the above noted data store may be, in whole or in part, distributed in a cloud computing topology. In this way, computer 112 and storage device 116 may refer to multiple devices, which may also be distributed throughout the network.

In some implementations, computer 112 may execute a collaboration application (e.g., collaboration application 120), examples of which may include, but are not limited to, e.g., a file/data sharing application, a web conferencing application, a video conferencing application, a telephony application, a voice-over-IP application, a video-over-IP application, an Instant Messaging (IM)/"chat" application, a chatbot application, a short messaging service (SMS)/multimedia messaging service (MMS) application, or other application that allows for virtual meeting, remote collaboration, and/or file/data sharing. [In some implementations, modify process 110 and/or collaboration application 120 may be accessed via one or more of client applications 122, 124, 126, 128. In some implementations, modify process 110 may be a standalone application, or may be an applet/application/script/extension that may interact with and/or be executed within collaboration application 120, a component of collaboration application 120, and/or one or more of client applications 122, 124, 126, 128. In some implementations, collaboration application 120 may be a standalone application, or may be an applet/application/script/extension that may interact with and/or be executed within modify process 110, a component of modify process 110, and/or one or more of client applications 122, 124, 126, 128. In some implementations, one or more of client applications 122, 124, 126, 128 may be a standalone application, or may be an applet/application/script/extension that may interact with and/or be executed within and/or be a component of modify process 110 and/or collaboration application 120. Examples of client applications 122, 124, 126, 128 may include, but are not limited to, e.g., a VR application, XR or MR application, an AR application, a file/data sharing application, a web conferencing application, a video conferencing application, a telephony application, a voice-over-IP application, a video-over-IP application, an Instant Messaging (IM)/"chat" application, a chatbot application, a short messaging service (SMS)/multimedia messaging service (MMS) application, or other application that allows for virtual meeting, remote collaboration, and/or file/data sharing, a standard and/or mobile web browser, an email application (e.g., an email client application), a textual and/or a graphical user interface, a customized web browser, a plugin, an Application Programming Interface (API), or a custom application. The instruction sets and subroutines of client applications 122, 124, 126, 128, which may be stored on storage devices 130, 132, 134, 136, may be executed by one or more processors and one or more memory architectures incorporated into client electronic devices 138, 140, 142, 144.

In some implementations, one or more of storage devices 130, 132, 134, 136, may include but are not limited to: hard disk drives; flash drives, tape drives; optical drives; RAID arrays; random access memories (RAM); and read-only memories (ROM). Examples of client electronic devices 138, 140, 142, 144 (and/or computer 112) may include, but are not limited to, a personal computer (e.g., client electronic device 138), a laptop computer (e.g., client electronic device 140), a smart/data-enabled, cellular phone (e.g., client electronic device 142), a notebook computer (e.g., client electronic device 144), a tablet, a server, a television, a smart television, a smart speaker, an Internet of Things (IOT) device, a media (e.g., audio/video, photo, etc.) capturing and/or output device, an audio input and/or recording device (e.g., a handheld microphone, a lapel microphone, an embedded microphone/speaker (such as those embedded within eyeglasses, smart phones, tablet computers, smart televisions, smart speakers, watches, etc.), an infotainment device (e.g., such as those found in vehicles combining information and/or entertainment with optional screens and/or audio for such things as navigation, multimedia, connectivity, voice control, smartphone integration, touchscreen interface, internet and apps, rear-seat entertainment, etc.), a dedicated network device, and combinations thereof. Client electronic devices 138, 140, 142, 144 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 122, 124, 126, 128 may be configured to effectuate some or all of the functionality of modify process 110 (and vice versa). Accordingly, in some implementations, modify process 110 may be a purely server-side application, a purely client-side application, or a hybrid server-side/client-side application that is cooperatively executed by one or more of client applications 122, 124, 126, 128 and/or modify process 110.

In some implementations, one or more of client applications 122, 124, 126, 128 may be configured to effectuate some or all of the functionality of collaboration application 120 (and vice versa). Accordingly, in some implementations, collaboration application 120 may be a purely server-side application, a purely client-side application, or a hybrid server-side/client-side application that is cooperatively executed by one or more of client applications 122, 124, 126, 128 and/or collaboration application 120. As one or more of client applications 122, 124, 126, 128, modify process 110, and collaboration application 120, taken singly or in any combination, may effectuate some or all of the same functionality, any description of effectuating such functionality via one or more of client applications 122, 124, 126, 128, modify process 110, collaboration application 120, or combination thereof, and any described interaction(s) between one or more of client applications 122, 124, 126, 128, modify process 110, collaboration application 120, or combination thereof to effectuate such functionality, should be taken as an example only and not to limit the scope of the disclosure.

In some implementations, one or more of users 146, 148, 150, 152 may access computer 112 and modify process 110 (e.g., using one or more of client electronic devices 138, 140, 142, 144) directly through network 114 or through network 118. Further, computer 112 may be connected to network 114 through network 118, as illustrated with phantom link line 154. Modify process 110 may include one or more user interfaces, such as browsers and textual or graphical user interfaces, through which users 146, 148, 150, 152 may access modify process 110.

In some implementations, the various client electronic devices may be directly or indirectly coupled to network 114 (or network 118). For example, client electronic device 138 is shown directly coupled to network 114 via a hardwired network connection. Further, client electronic device 144 is shown directly coupled to network 118 via a hardwired network connection. Client electronic device 140 is shown wirelessly coupled to network 114 via wireless communication channel 156 established between client electronic device 140 and wireless access point (i.e., WAP 158), which is shown directly coupled to network 114. WAP 158 may be, for example, an IEEE 802.11a, 802.11b, 802.11g, 802.11n, 802.11ac, Wi-Fi®, RFID, and/or Bluetooth™ (including Bluetooth™ Low Energy) or any device that is capable of establishing wireless communication channel 156 between client electronic device 140 and WAP 158 (e.g., Zigbee, Z-Wave, etc.). Client electronic device 142 is shown wirelessly coupled to network 114 via wireless communication channel 160 established between client electronic device 142 and cellular network/bridge 162, which is shown by example directly coupled to network 114.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used. In some implementations, computer 112 may be directed or controlled by an operator. Computer 112 may be hosted by one or more of assets owned by the operator, assets leased by the operator, and third-party assets. The assets may be referred to as a private, community, or hybrid cloud computing network or cloud computing environment. For example, computer 112 may be partially or fully hosted by a third-party offering software as a service (Saas), platform as a service (PaaS), and/or infrastructure as a service (IaaS). Computer 112 may be implemented using agile development and operations (DevOps) principles. In some implementations, some or all of computer 112 may be implemented in a multiple-environment architecture. For example, the multiple environments may include one or more production environments, one or more integration environments, one or more development environments, etc.

In some implementations, various I/O requests (e.g., I/O request 115) may be sent from, e.g., client applications 122, 124, 126, 128 to, e.g., computer 112 (and vice versa). Examples of I/O request 115 may include but are not limited to, data write requests (e.g., a request that content be written to computer 112) and data read requests (e.g., a request that content be read from computer 112). Client electronic devices 138, 140, 142, 144 and/or computer 112 may also communicate audibly using an audio codec, which may receive spoken information from a user and convert it to usable digital information. An audio codec may likewise generate audible sound for a user, such as through a speaker, e.g., in a handset of a client electronic device. Such sound may include sound from voice telephone calls, may include recorded sound (e.g., voice messages, music files, etc.) and may also include sound generated by applications operating on the client electronic devices.

Figure 2:
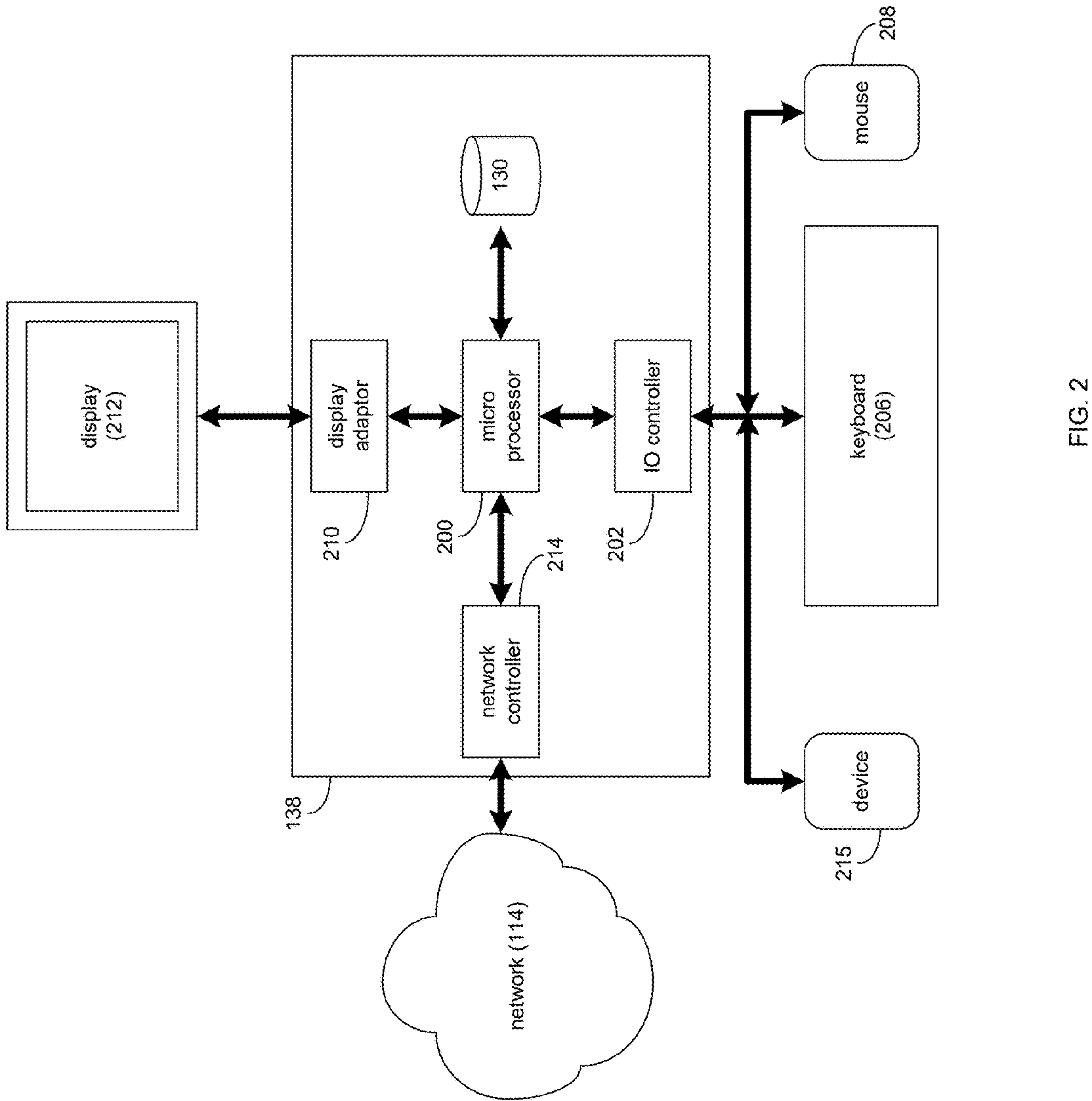
FIG. 2 is an example diagrammatic view of a client electronic device of FIG. 1 according to one or more example implementations of the disclosure.
Figure 3:
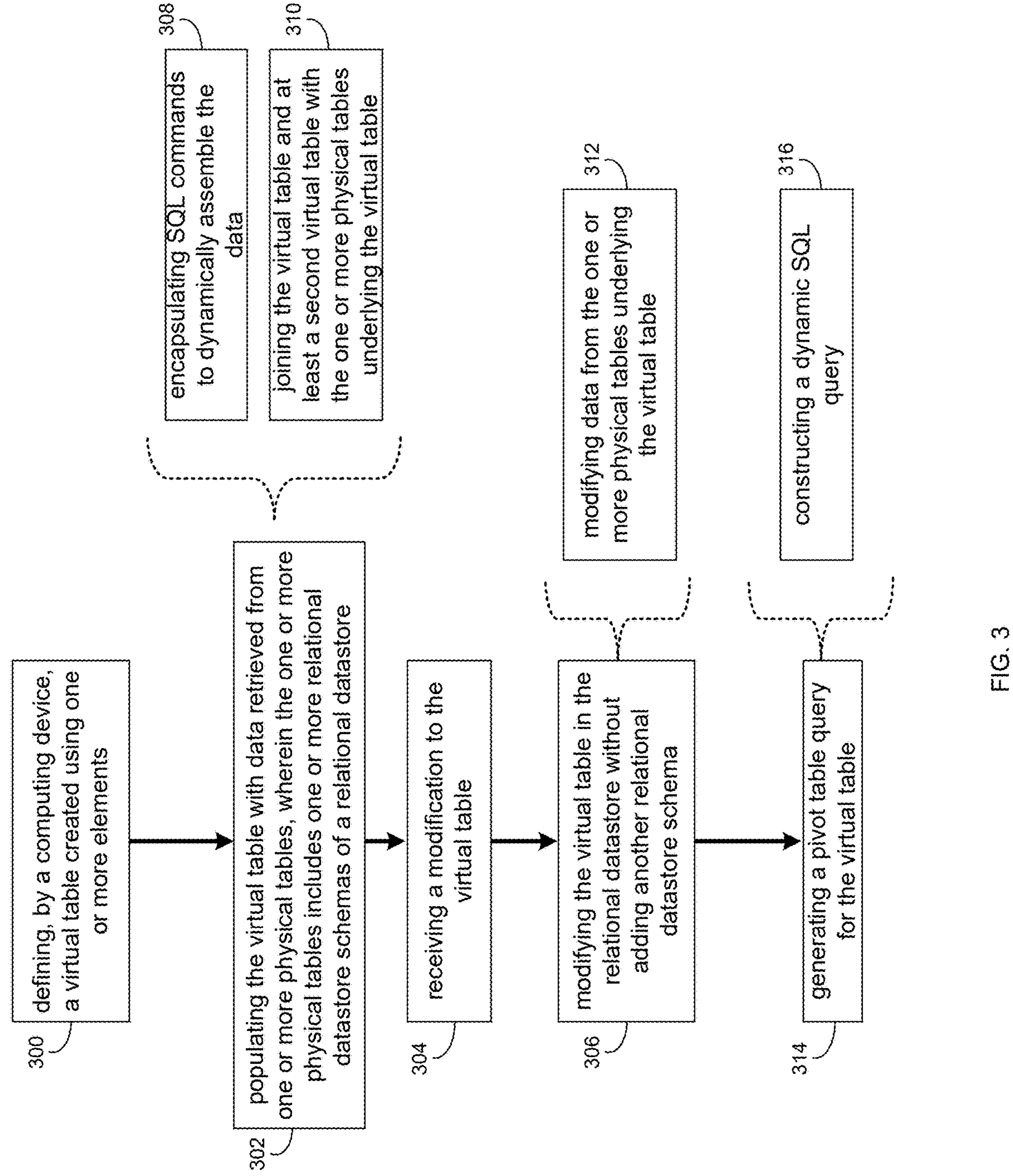
FIG. 3 is an example flowchart of a modify process according to one or more example implementations of the disclosure.
Figure 4:
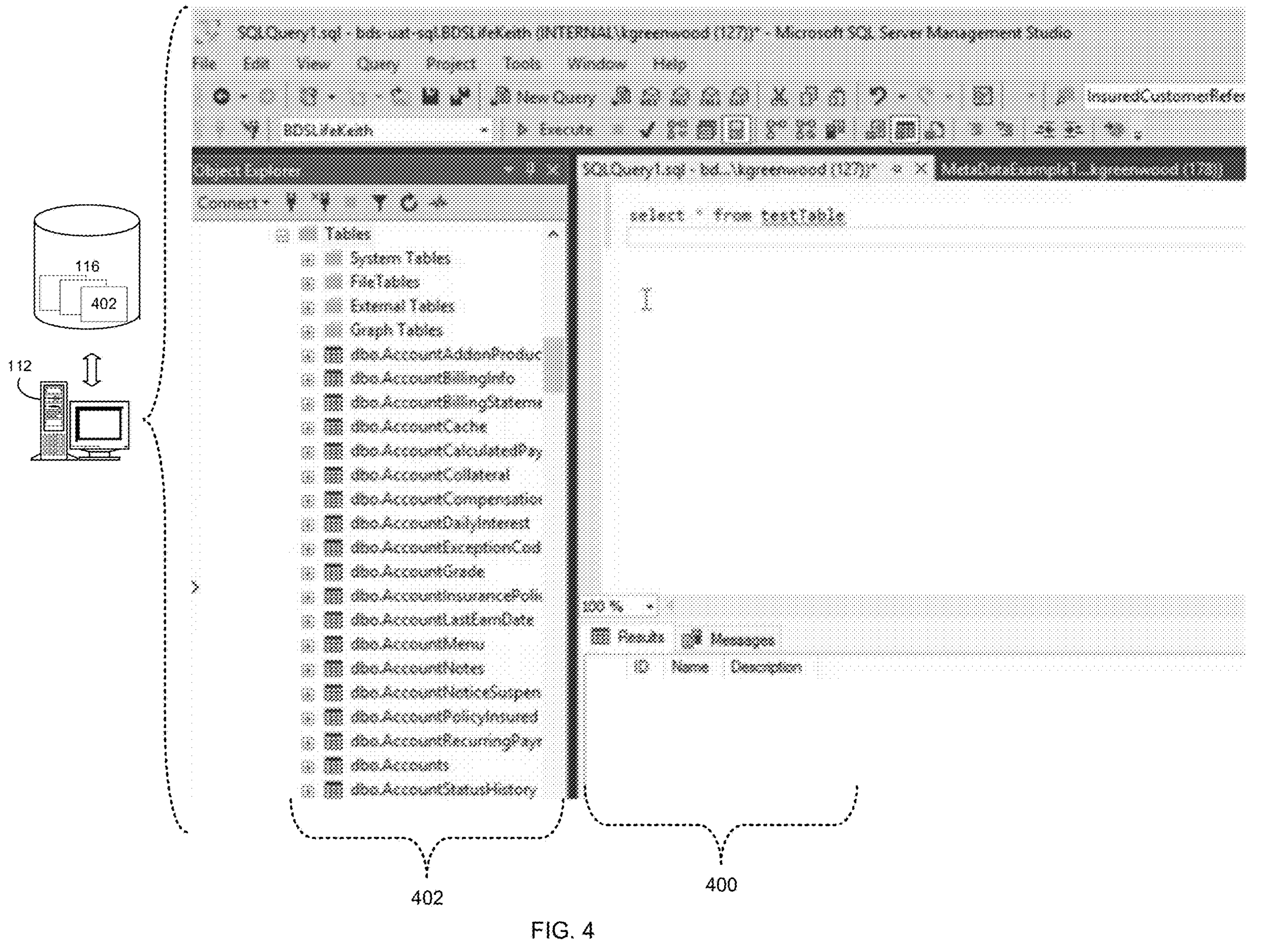
FIG. 4 is an example diagrammatic view of a screen image displayed by a modify process according to one or more example implementations of the disclosure.
Figure 5:
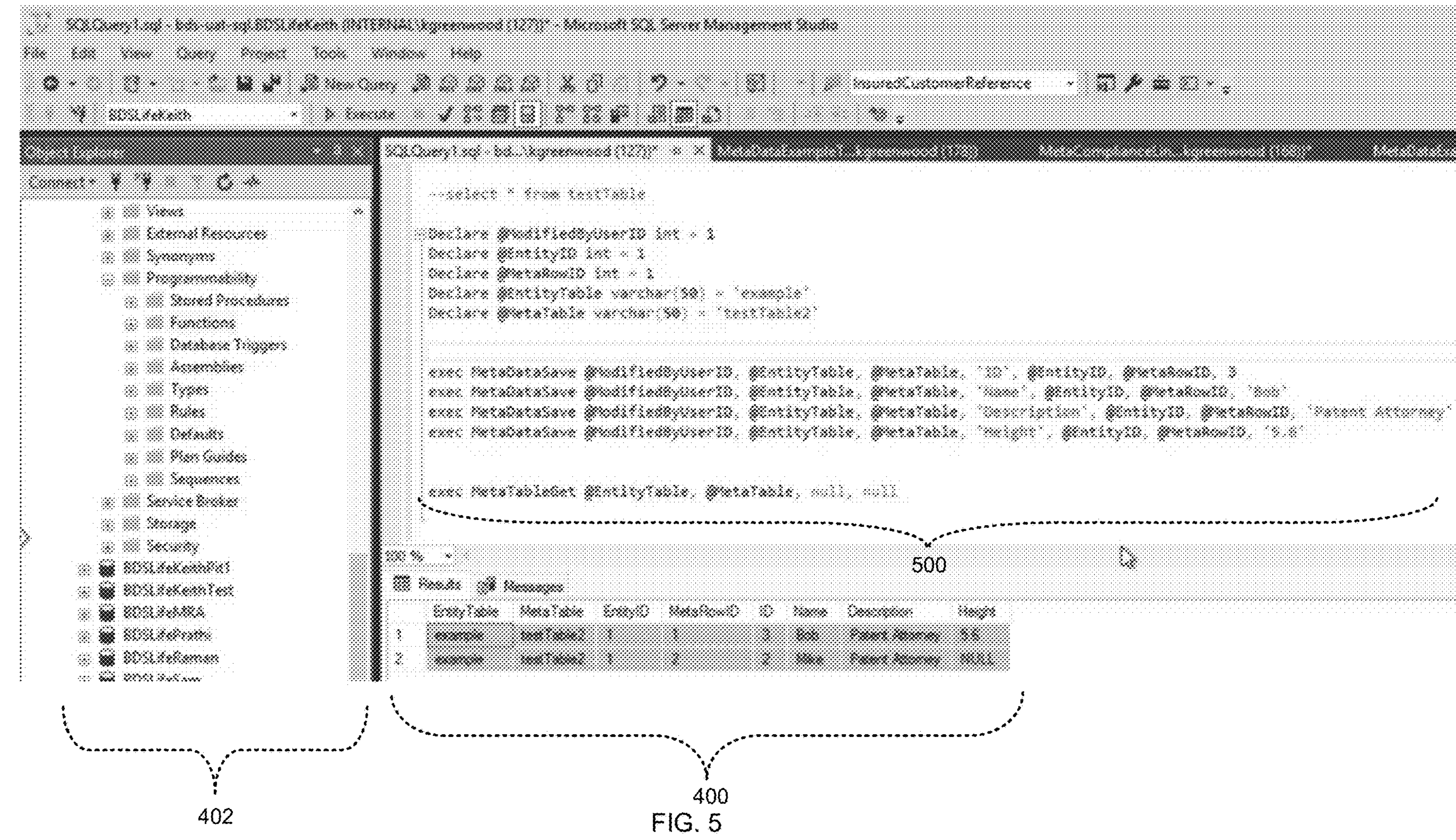
FIG. 5 is an example diagrammatic view of a screen image displayed by a modify process according to one or more example implementations of the disclosure.

Referring also to the example implementation of FIG. 2, there is shown a diagrammatic view of client electronic device 138. While client electronic device 138 is shown in this figure, this is for example purposes only and is not intended to be a limitation of this disclosure, as other configurations are possible. Additionally, any computing device capable of executing, in whole or in part, modify process 110 may be substituted for client electronic device 138 (in whole or in part) within FIG. 2, examples of which may include but are not limited to computer 112 and/or one or more of client electronic devices 140, 142, 144.

In some implementations, client electronic device 138 may include a processor (e.g., microprocessor 200) configured to, e.g., process data and execute the above-noted code/instruction sets and subroutines. Microprocessor 200 may be coupled via a storage adaptor to the above-noted storage device(s) (e.g., storage device 130). An I/O controller (e.g., I/O controller 202) may be configured to couple microprocessor 200 with various devices (e.g., via wired or wireless connection), such as keyboard 206, pointing/selecting device (e.g., touchpad, touchscreen, mouse 208, etc.), scanner, custom device (e.g., device 215), USB ports, and printer ports. A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to network 114 (e.g., the Internet or a local area network).

Generally, the use of a relational datastore (e.g., a relational database) requires development of its schema ahead of time, and it normally specifically matches the current usage of the datastore. This can be time consuming, and can also mean that one can only implement changes the schema during an application update (e.g., during a deployment), which is a significant technological disadvantage.

Notably, known "tables" or spreadsheets, while they can be saved, it will be appreciated by one skilled in the art after reading the present disclosure that such spreadsheets are not being saved directly into a server database (e.g., a SQL Server database) where the data can then be queried. Again, while such a spreadsheet can always be imported to the database, the spreadsheet data does not directly go into the database, and each time the spreadsheet is imported, it would require creating a new table (and new schema) every time for each spreadsheet and for every update to the spreadsheet made on the user's front end. For instance, updating the data and adding a column on the user's front end would require storing two different spreadsheets into the datastore, each with their own schema, as the additional data and new column does not match the initial database schema structure stored in the database on the backend.

As known to those skilled in the art, a database "schema" is the structural blueprint that defines the organization, storage, and relationships of data within a database, encompassing tables, columns, data types, indexes, relationships, constraints, and other database objects. It essentially dictates how data is stored and how different parts of the database interact with each other. Modifying a schema typically involves adding, removing, or altering tables, columns, or relationships, which can be complex and risky because it can affect the integrity of the database, requires careful planning, and often leads to downtime during implementation. This is why modifications to tables generally leads to simply creating a new schema when changes are needed. Therefore, as will be discussed in greater detail below, the present disclosure enables a virtual table that is a faster and more efficient datastore implementation where one does not have to wait for a new schema to be generated to make updates/changes, but instead is able to modify the existing schema to accommodate the updates/changes. Changes may be made at any time without the need to make new schemas for each change, as data can be saved in a relational fashion on the fly, and one can create new table structures on the fly as well by modifying the existing (original) schema. The design utilizes a set of tables, views, functions, and stored procedures that when used together allow virtual relational tables to be defined, populated, updated, deleted and queried without the creation of additional physical schema as is the standard way of developing new relational tables. All work together to provide this functionality, and the stored procedure(s) include the commands that retrieve the virtual table data along with (or without) being joined seamlessly to existing physical tables.

The Modify Process:

As discussed above and referring also at least to the example implementations of FIGS. 3-7, modify process 110 may define 300, by a computing device, a virtual table created using one or more elements. Modify process 110 may populate 302 the virtual table with data retrieved from one or more physical tables, wherein the one or more physical tables may include one or more relational datastore schemas of a relational datastore. Modify process 110 may receive 304 a modification to the virtual table. Modify process 110 may modify 306 the virtual table in the relational datastore without adding another relational datastore schema.

In some implementations, modify process 110 may define 300, by a computing device, a virtual table created using one or more elements (e.g., physical tables, views, functions, and stored procedures), and in some implementations, modify process 110 may populate 302 the virtual table with data retrieved from one or more physical tables, wherein the one or more physical tables may include one or more relational datastore schemas of a relational datastore. A database "schema" is the structural blueprint that defines the organization, storage, and relationships of data within a database, encompassing tables, columns, data types, indexes, relationships, constraints, and other database objects. It essentially dictates how data is stored and how different parts of the database interact with each other. Modifying a schema typically involves adding, removing, or altering tables, columns, or relationships, which can be complex and risky because it can affect the integrity of the database, requires careful planning, and often leads to downtime during implementation. This is why modifications to tables generally leads to simply creating a new schema when changes are needed. However, unlike such systems, the present disclosure may include a virtual table, which may generally be described as a conceptual representation of data in a datastore (e.g., database) that does not physically store data itself but instead dynamically generates data from a query based on one or more existing physical tables. For instance, and referring at least to the example implementation of FIG. 4, an example user interface (UI) of a server management application is shown. In the example, there is shown a virtual table (e.g., virtual table 400), with rows and columns (e.g., ID, Name and Description). Unlike physical tables (such as physical tables 402), virtual tables do not require physical storage, allowing them to present data in specific formats or structures without duplicating the underlying data. This makes virtual tables especially useful for scenarios where data needs to be represented differently, such as through aggregations or filtered subsets, without the need to create new physical tables or alter their schemas.

Generally, virtual tables may be implemented as dynamic views, which are special types of database views created and manipulated at runtime using stored procedures. Unlike static views that are permanently stored in the database schema, dynamic views are generated on-the-fly based on the current needs of the application or specific user queries. A "view" may generally be described as essentially a saved SQL query that behaves like a table, allowing data from physical tables to be queried as if it were a distinct table. For instance, a view might be defined to aggregate data from an "Employees" table, grouping the data by department and counting the number of employees in each. However, the view does not store this aggregated data; it simply retrieves and displays it each time the view is queried.

In some implementations, dynamic views may be created within stored procedures, allowing for highly customizable data representations. These stored procedures construct (e.g., via modify process 110) SQL queries dynamically, incorporating parameters such as user inputs or session variables to define the structure and content of the view. This approach eliminates the need for additional physical storage or schema changes, as the virtual table (view) is generated based on the existing physical data structures. Because views are just saved queries, they do not require physical storage for the data, ensuring that the data in a virtual table is always current with the underlying physical tables. Stored procedures dynamically generate views that serve as virtual tables without altering the physical database schema. For example, a stored procedure might create (e.g., via modify process 110) a dynamic view to display sales data filtered by region and date, constructing the view's query based on user-provided parameters. The view acts as a virtual table, allowing users to query it as though it were a physical table, but with the flexibility of being dynamically generated each time it is needed.

Functions in databases may generally be described as reusable blocks of code that perform specific operations and return a value or a set of values. They can take input parameters, process those inputs according to the logic defined within the function, and then return a result. Functions may be used for tasks such as calculations, data manipulation, and querying data from tables. There are different types of functions, including scalar functions, which return a single value, and table-valued functions (TVFs), which return a table of data. Table-valued functions may be used in some implementations for defining virtual tables, as they allow the creation of a dynamic data set that behaves like a table, based on the function's logic and input parameters.

When a table-valued function is used to define a virtual table, the data may be generated dynamically every time the function is called. This allows for flexible and customizable data representation, as the function can accept parameters that modify the output according to specific needs. The logic encapsulated in the function can be reused across different queries, providing consistency and reducing redundancy. The virtual tables generated by these functions can also be integrated with existing physical tables or views, enabling complex data interactions without requiring additional physical storage or virtual schema modification. For example, consider a table-valued function that returns only high-value orders from an Orders table, where the threshold for what constitutes a high-value order is passed as a parameter. This function could be defined to return a virtual table with populated data containing only those orders where the total amount exceeds a specified value. The result is a flexible and efficient way to generate a subset of data that meets specific criteria, which can be queried just like a regular table.

Using functions to define virtual tables offers several example advantages, including flexibility, efficiency, and the ability to dynamically update data. Since the data is generated on the fly, any changes to the underlying physical tables are immediately reflected in the virtual table, ensuring that the data is always current. This enables a dynamic, scalable database design that can adapt to changing requirements without the need for additional physical schema.

In some implementations, populating the virtual table may include encapsulating 308 SQL commands to dynamically assemble the data. For instance, SQL commands (or similar commands using another database management platform) may be encapsulated within stored procedures or functions to assemble data in real-time based on specific input parameters or conditions. This dynamic assembly allows the virtual table to reflect the most current and relevant data without altering the underlying database schema. For example, a stored procedure of modify process 110 may dynamically build a SQL query that filters and aggregates data based on user inputs, ensuring that the virtual table adapts to different needs at runtime. Functions, particularly table-valued functions, help return a result set that behaves like a table, further enhancing the flexibility of virtual tables.

In some implementations, populating the virtual table may include joining 310 the virtual table and at least a second virtual table with the one or more physical tables underlying the virtual table. For example, modify process 110 may join a virtual table with other virtual tables. By combining data from multiple dynamically generated data sets, complex and informative views can be created, linking different aspects of data even when they are not physically stored together. For instance, joining a virtual table summarizing sales data with another virtual table containing customer details allows for the creation of a composite view that provides a comprehensive look at customer purchases. This technique may leverage SQL join operations to integrate data from various sources, enhancing the depth and breadth of the insights that can be gained from the virtual tables.

Additionally, virtual tables can be joined with the physical tables from which they draw their data, enriching the virtual table's content with additional context or details. This process involves linking dynamically generated data with static data stored in the database, such as joining a virtual table that aggregates sales with a physical table containing product information. This combination allows for a more detailed and comprehensive view of the data, integrating the dynamically generated summaries with the specific attributes stored in the physical tables. Together, these techniques enable virtual tables to be powerful tools for flexible, efficient, and dynamic data management, adapting to evolving data requirements while maintaining a comprehensive and up-to-date view of the information.

In some implementations, modify process 110 may receive 304 a modification to the virtual table, and as a result, modify process 110 may modify 306 the virtual table in the relational datastore without adding another relational datastore schema. For instance, in some implementations, modifying the virtual table in the relational datastore without adding another relational datastore schema may include modifying 312 data from one or more physical tables underlying the virtual table. Since a virtual table is typically implemented as a view (e.g., a stored SQL query), modifications to a virtual table are not as straightforward as those made to a physical table, which is why, unlike the present disclosure, known systems must either modify the schema or create a new physical table when making changes. Instead, modifications may involve one or more of the following actions: updating the underlying physical data, altering the SQL query that defines the view, or modifying the logic within a stored procedure or function that generates the virtual table.

When modify process 110 modifies a virtual table, this may be accomplished through several approaches, each allowing users to adjust the content and behavior of the virtual table without altering the underlying database schema. In some implementations, an approach may involve modifying the underlying physical data that the virtual table is based on. Since a virtual table may be implemented as a view that reflects data from one or more physical tables, any changes made to the data in these tables-such as updating, inserting, or deleting records-will immediately be reflected in the virtual table. For example, if the virtual table displays customer orders, updating the quantity of an order in the Orders physical table would directly alter what is shown in the virtual table without requiring any changes to the table's structure or schema. This method ensures that the virtual table adapts to changes in the data while keeping the physical schema intact.

In some implementations, another approach to modifying a virtual table may involve altering the SQL query that defines the virtual table. For instance, virtual tables, being implemented as views, may be based on predefined SQL queries. By modifying this query—such as changing the selection criteria in the WHERE clause, adding or removing columns from the SELECT statement, or adjusting how data is aggregated in the GROUP BY clause—a user may (e.g., via modify process 110) change what the virtual table displays. For instance, if the view that defines a virtual table initially filters data by year, altering the WHERE clause to filter by a different year or by a specific region would modify the data shown in the virtual table. This modification impacts only how the data is retrieved and presented, without affecting the physical schema of the database. This approach allows for dynamic adjustments to the virtual table's content based on changing requirements, all while preserving the underlying structure of the database.

In some implementations, another approach may involve modifying the logic within a stored procedure or function that generates the virtual table. If the virtual table is created dynamically through a stored procedure or a table-valued function, the user (e.g., via modify process 110) may change the logic or parameters within these database objects to alter how the data is assembled and presented. For example, a stored procedure that dynamically assembles sales data based on input parameters such as region and date range can be modified to include additional filtering criteria or to calculate different aggregations. By adjusting the SQL commands and logic within the procedure or function, the virtual table can be customized to meet new requirements without altering the database schema. This method provides a high level of flexibility, enabling complex modifications to the virtual table's content while maintaining the physical schema of the database unchanged. Each of these approaches allows the virtual table to be tailored to specific needs, ensuring that it remains flexible, up-to-date, and relevant, all without the need for modifying the underlying physical schema. An example of this is shown in the example implementation of FIG. 5, where the UI from FIG. 4 now shows that the virtual table (e.g., virtual table 400) has additional rows, columns, and populated data that is populated from physical tables 402 by modifying the logic (e.g., logic 500) within a stored procedure or function that generates the virtual table.

In some implementations, modify process 110 may generate 314 a pivot table query for the virtual table, which, in some implementations, generating the pivot table query for the virtual table may include constructing 316 a dynamic SQL query. For instance, generating a pivot table query for a virtual table may include constructing a dynamic SQL query that allows the data to be pivoted based on user-defined criteria. This process includes identifying the data source, which could be the virtual table itself or the underlying physical tables that the virtual table is based on. Once the data source is identified, the next step is to determine which data will be used as row labels, which data will be pivoted into columns, and what type of aggregation, such as SUM, COUNT, or AVG, will be applied to the data. For instance, in a sales data scenario, one may choose Region as the row label, Product as the pivoted column, and use the SUM function to aggregate sales figures.

To create a pivot table that can adapt to different scenarios, a dynamic SQL query may be constructed at runtime. This may involve declaring variables to hold different parts of the SQL query, such as the select clause, the pivoted columns, and the overall SQL command. The columns to be pivoted may be dynamically assembled by querying the data to identify distinct values, which are then used to create the pivoted columns. For example, modify process 110 may query the distinct Product names to determine the columns for each product in the pivot table. After identifying these columns, the pivot table query may be constructed using the PIVOT clause in SQL, where the dynamically assembled columns are specified, and the aggregation function is applied to the data.

In some implementations, once the SQL query is fully constructed, it may be executed by modify process 110 using a command like EXEC sp_executesql, which runs the dynamically generated SQL code and creates the pivot table. After the pivot table is generated, it can be integrated with other virtual tables or physical tables, such as by joining it with additional data sources to enrich the analysis further as discussed above. This dynamic SQL approach offers significant example and non-limiting benefits, including flexibility, as it allows the pivot table query to be adjusted on the fly based on different inputs or user requirements. It also provides scalability, as the pivot columns are determined dynamically, making it easy to handle a large number of categories or dimensions, even as new data is added to the database. Moreover, this ensures efficiency by optimizing the pivot table query for the current data set, avoiding unnecessary processing. Overall, generating and modifying pivot tables dynamically through dynamic SQL allows for comprehensive and adaptable data analysis without the need to alter the underlying database or table schema.

Figure 6:
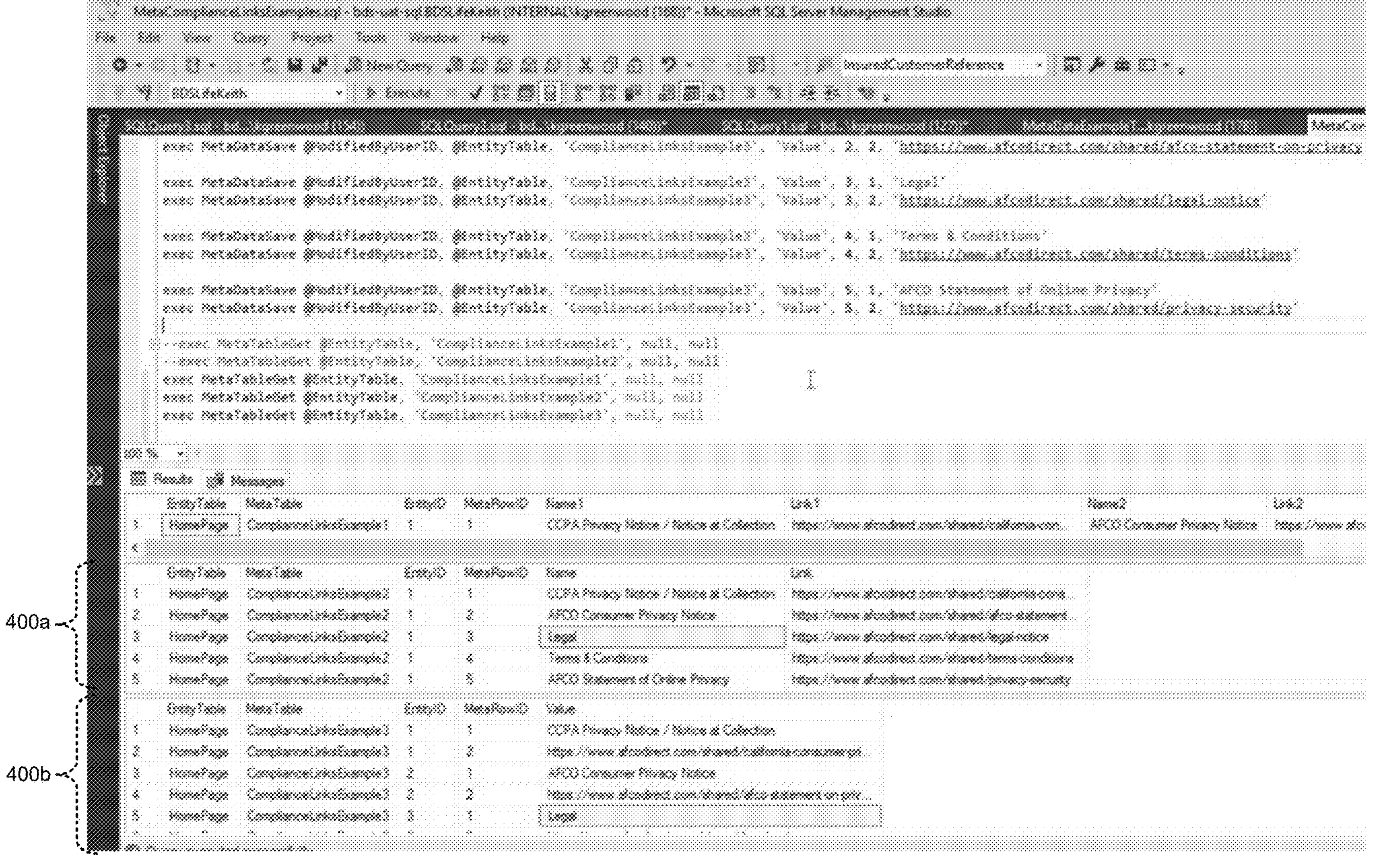
FIG. 6 is an example diagrammatic view of a screen image displayed by a modify process according to one or more example implementations of the disclosure.
Figure 7:
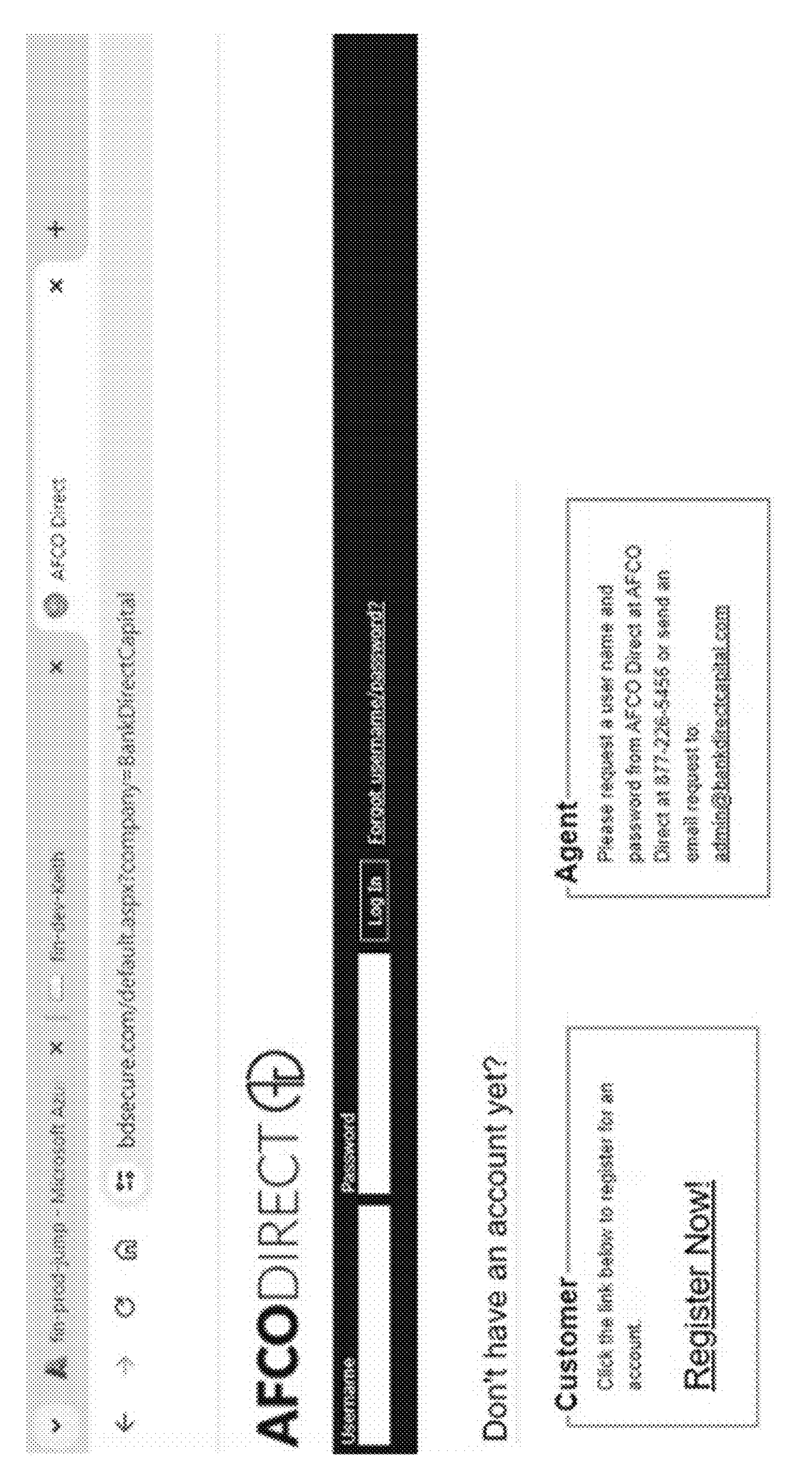
FIG. 7 is an example diagrammatic view of a webpage created by a modify process according to one or more example implementations of the disclosure.

It will be appreciated after reading the present disclosure that while a table (e.g., spreadsheet) is described, the present disclosure is not so limiting, and may be used with anything that uses a table structure, such as a website design. (doesn't need to be limited to spreadsheet, can be anything that uses a table structure like website design). As an example, FIG. 6 shows a view of the UI (e.g., web or desktop) of FIGS. 4-5, but now using multiple tables (e.g., tables 400*a* and 400*b*) to help create a website (e.g., website 700 shown in FIG. 7). Moreover, the use of virtual tables enables an added benefit of allowing each user to have their own desired view of the virtual table (using the same underlying data) as well as their own desired view of what the virtual table represents (such as website 700). As such, the use of a spreadsheet, as well as the particular organization of the tables, should be taken as example only and not to otherwise limit the scope of the present disclosure.

It will also be appreciated after reading the present disclosure that the data may be any data type (e.g., text data, numerical data, media such as pictures, etc.) in any of these columns, as well as have an end user define their own data in the system. As such, the use of numerical data and text data should be taken as example only and not to otherwise limit the scope of the present disclosure.

In some implementations, modify process 110 may enable row and column level security so that users can only see data they have access to. For instance, to implement row and column-level security in a database, modify process 110 may control access to specific rows and columns, ensuring that users can only view or interact with the data they are authorized to access. This may restrict access at the row level by creating security policies that filter rows based on user roles or identities. This process may involve creating a predicate function that returns a boolean value indicating whether a row should be accessible to the current user, e.g., by checking the user's role or ID against the data in the row. This function may then be applied to the relevant table through a security policy, ensuring that only rows meeting the criteria are visible to the user.

Column-level security restricts access to specific columns within a table, ensuring users only see the columns they are permitted to view. In some implementations, modify process 110 may create views that expose only the columns a user is allowed to access. Users are granted access to these views instead of the base table, effectively controlling column access. Additionally, column-level permissions may be directly applied to restrict access to sensitive columns, such as by denying SELECT access to certain columns for specific roles. Dynamic Data Masking is another tool that can obfuscate data in specific columns, making the data unreadable while allowing users to see that the data exists.

The terminology used herein is for the purpose of describing particular implementations only and is not intended to be limiting of the disclosure. As used herein, the singular forms "a", "an" and "the" are intended to include the plural forms as well, including any steps performed by a/the computer/ processor, unless the context clearly indicates otherwise. As used herein, the phrase "at least one of A, B, and C" should be construed to mean a logical (A OR B OR C), using a non-exclusive logical OR, and should not be construed to mean "at least one of A, at least one of B, and at least one of C." As another example, the language "at least one of A and B" (and the like) as well as "at least one of A or B" (and the like) should be interpreted as covering only A, only B, or both A and B, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof. Example sizes/models/values/ranges can have been given, although examples are not limited to the same.

The terms (and those similar to) "coupled," "attached," "connected," "adjoining," "transmitting," "communicating," "receiving," "connected," "engaged," "adjacent," "next to," "on top of," "above," "below," "abutting," and "disposed," used herein is to refer to any type of relationship, direct or indirect, between the components in question, and may apply to electrical, mechanical, fluid, optical, electromagnetic, electromechanical or other connections, including logical connections via intermediate components (e.g., device A may be coupled to device C via device B). Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action is to occur, either in a direct or indirect manner. The term "set" does not necessarily exclude the empty set—in other words, in some circumstances a "set" may have zero elements. The term "non-empty set" may be used to indicate exclusion of the empty set—that is, a non-empty set must have one or more elements, but this term need not be specifically used. The term "subset" does not necessarily require a proper subset. In other words, a "subset" of a first set may be coextensive with (equal to) the first set. Further, the term "subset" does not necessarily exclude the empty set—in some circumstances a "subset" may have zero elements.

The corresponding structures, materials, acts, and equivalents (e.g., of all means or step plus function elements) that may be in the claims below are intended to include any structure, material, or act for performing the function in combination with other claimed elements as specifically claimed. While the disclosure describes structures corresponding to claimed elements, those elements do not necessarily invoke a means plus function interpretation unless they explicitly use the signifier "means for." Unless otherwise indicated, recitations of ranges of values are merely intended to serve as a shorthand way of referring individually to each separate value falling within the range, and each separate value is hereby incorporated into the specification as if it were individually recited. While the drawings divide elements of the disclosure into different functional blocks or action blocks, these divisions are for illustration only. According to the principles of the present disclosure, functionality can be combined in other ways such that some or all functionality from multiple separately-depicted blocks can be implemented in a single functional block; similarly, functionality depicted in a single block may be separated into multiple blocks. Unless explicitly stated as mutually exclusive, features depicted in different drawings can be combined consistent with the principles of the present disclosure. Moreover, although this disclosure describes and depicts respective implementations herein as including particular components, elements, feature, functions, operations, or steps (and arrangements thereof), any of these implementations may include any combination, arrangement, or permutation of any of the components, elements, features, functions, operations, or steps described or depicted anywhere herein that a person having ordinary skill in the art would comprehend after reading the present disclosure. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The description of the present disclosure has been presented for purposes of illustration and description but is not intended to be exhaustive or limited to the disclosure in the form disclosed. After reading the present disclosure, many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated. The features of any dependent claim may be combined with the features of any of the independent claims or other dependent claims.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method, comprising:

defining, by a computing device, a virtual table created using one or more elements in a query, wherein the one or more elements used to originally define the virtual table include functions and stored procedures;

populating the virtual table by joining at least two different virtual tables with data retrieved from different physical tables of one or more physical tables that includes one or more relational datastore schemas of a relational datastore;

receiving a modification to the virtual table by altering the query, wherein receiving the modification to the virtual table by altering the query includes modifying logic within one of the stored functions and the stored procedures used to originally define the virtual table using the one or more elements in the query; and modifying the virtual table in the relational datastore without adding another relational datastore schema based upon, at least in part, altering of the query by modifying the logic within one of the stored functions and the stored procedures used to originally define the virtual table using the one or more elements in the query.

2. The computer-implemented method of claim 1, wherein the one or more elements include at least one of the one or more physical tables, and views.

3. The computer-implemented method of claim 1, wherein populating the virtual table includes encapsulating SQL commands to dynamically assemble the data.

4. The computer-implemented method of claim 1, wherein modifying the virtual table in the relational datastore without adding another relational datastore schema includes modifying data from the one or more physical tables underlying the virtual table.

5. The computer-implemented method of claim 1 further comprising generating a pivot table query for the virtual table.

6. The computer-implemented method of claim 5, wherein generating the pivot table query for the virtual table includes constructing a dynamic SQL query.

7. A computer program product residing on a non-transitory computer readable storage medium having a plurality of instructions stored thereon which, when executed across one or more processors, causes at least a portion of the one or more processors to perform operations comprising:

defining a virtual table created using one or more elements in a query, wherein the one or more elements used to originally define the virtual table include functions and stored procedures;

populating the virtual table by joining at least two different virtual tables with data retrieved from different physical tables of one or more physical tables that includes one or more relational datastore schemas of a relational datastore;

receiving a modification to the virtual table by altering the query, wherein receiving the modification to the virtual table by altering the query includes modifying logic within one of the stored functions and the stored procedures used to originally define the virtual table using the one or more elements in the query; and modifying the virtual table in the relational datastore without adding another relational datastore schema based upon, at least in part, altering of the query by modifying the logic within one of the stored functions and the stored procedures used to originally define the virtual table using the one or more elements in the query.

8. The computer program product of claim 7, wherein the one or more elements include at least one of the one or more physical tables, and views.

9. The computer program product of claim 7, wherein populating the virtual table includes encapsulating SQL commands to dynamically assemble the data.

10. The computer program product of claim 7, wherein modifying the virtual table in the relational datastore without adding another relational datastore schema includes modifying data from the one or more physical tables underlying the virtual table.

11. The computer program product of claim 7, wherein the operations further comprise generating a pivot table query for the virtual table.

12. The computer program product of claim 11, wherein generating the pivot table query for the virtual table includes constructing a dynamic SQL query.

13. A computing system including one or more processors and one or more memories configured to perform operations comprising:

defining a virtual table created using one or more elements in a query, wherein the one or more elements used to originally define the virtual table include functions and stored procedures;

populating the virtual table by joining at least two different virtual tables with data retrieved from different physical tables of one or more physical tables that includes one or more relational datastore schemas of a relational datastore;

receiving a modification to the virtual table by altering the query, wherein receiving the modification to the virtual table by altering the query includes modifying logic within one of the stored functions and the stored procedures used to originally define the virtual table using the one or more elements in the query; and modifying the virtual table in the relational datastore without adding another relational datastore schema based upon, at least in part, altering of the query by modifying the logic within one of the stored functions and the stored procedures used to originally define the virtual table using the one or more elements in the query.

14. The computing system of claim 13, wherein the one or more elements include at least one of the one or more physical tables, and views.

15. The computing system of claim 13, wherein populating the virtual table includes encapsulating SQL commands to dynamically assemble the data.

16. The computing system of claim 13, wherein modifying the virtual table in the relational datastore without adding another relational datastore schema includes modifying data from the one or more physical tables underlying the virtual table.

17. The computing system of claim 13, wherein:

the operations further comprise generating a pivot table query for the virtual table, and generating the pivot table query for the virtual table includes constructing a dynamic SQL query.

* * * * *